United States Patent [19]
Dudley

[11] Patent Number: 5,192,868
[45] Date of Patent: Mar. 9, 1993

[54] PROPORTIONAL COUNTER DETECTOR

[75] Inventor: John M. Dudley, Knoxville, Tenn.

[73] Assignee: Tennelec/Nucleus Inc., Oak Ridge, Tenn.

[21] Appl. No.: 741,543

[22] Filed: Aug. 7, 1991

[51] Int. Cl.[5] .............................................. G01T 1/185
[52] U.S. Cl. .................................. 250/374; 250/380; 250/385.1
[58] Field of Search ...................... 250/374, 385.1, 379, 250/380

[56] References Cited

U.S. PATENT DOCUMENTS

| | | | |
|---|---|---|---|
| 2,499,830 | 3/1950 | Molloy ............................... | 250/374 |
| 5,025,162 | 6/1991 | Charpak ........................... | 250/385.1 |
| 5,083,027 | 1/1992 | Kuhn ................................ | 250/374 |
| 5,087,820 | 2/1992 | Kearns et al. .................... | 250/374 |

OTHER PUBLICATIONS

Tennelec, "LB5500 5 Inch Automatic Low Background Alpha/Beta Counting System" brochure.
Tennelec, "LB4000 Multi-Detector Low Level Alpha/Beta Counting System", bulletin.
Buneman, O. et al., "Design of Grid Ionization Chambers", Canadian Journal of Research, vol. 27, Sec. A, pp. 191-206.

Primary Examiner—Carolyn E. Fields
Assistant Examiner—Drew A. Dunn
Attorney, Agent, or Firm—Pitts and Brittian

[57] ABSTRACT

A proportional-type detector for the detection of low levels of radioactivity, such as alpha and beta particles generated by radioactive materials. In the preferred embodiment, this detector has a pancake-shaped cavity with a disk-shaped base and a cylindrical wall, with at least one anode member traversing the cavity. This anode member is maintained at an elevated potential so as to multiply and collect electrons formed within a counting gas within the cavity as a result of interaction between the radioactivity and a counter gas cavity. A perforated grid member, in one embodiment being a spiral coil, is substantially concentric with the anode member to provided a uniform electric field around the anode member. In the preferred embodiment, spacing between turns of the spiral grid is equal to or less than twice the radial distance between the anode member and the inside diameter of the grid. While an opening into the cavity can be covered with a window that is transparent to the radioactivity (the alpha and beta particles) for the retention of the counting gas, improved operation is obtained without a window for most applications.

19 Claims, 12 Drawing Sheets

| ALPHA | BETA | TOTAL | VOLTS | |
|---|---|---|---|---|
| 0 | 0 | 0 | 360 | |
| 0 | 3 | 3 | 390 | |
| 0 | 42 | 42 | 420 | |
| 0 | 505 | 505 | 450 | A |
| 0 | 1425 | 1425 | 480 | A |
| 0 | 2624 | 2624 | 510 | A |
| 0 | 4485 | 4485 | 540 | A |
| 0 | 6887 | 6887 | 570 | A |
| 0 | 9836 | 9836 | 600 | A |
| 0 | 12955 | 12955 | 630 | A |
| 0 | 16625 | 16625 | 660 | A |
| 0 | 17252 | 17252 | 690 | A |
| 0 | 17362 | 17362 | 720 | A |
| 0 | 17898 | 17898 | 750 | A |
| 0 | 18027 | 18027 | 780 | A |
| 0 | 17950 | 17950 | 810 | A |
| 0 | 18112 | 18112 | 840 | A |
| 0 | 17804 | 17804 | 870 | A |
| 0 | 17852 | 17852 | 900 | A |
| 0 | 18133 | 18133 | 930 | A |
| 0 | 18027 | 18027 | 960 | A |
| 0 | 18166 | 18166 | 990 | A |
| 0 | 18192 | 18192 | 1020 | A |
| 0 | 18077 | 18077 | 1050 | A |
| 73 | 18311 | 18384 | 1080 | A |
| 1009 | 17227 | 18236 | 1110 | I A |
| 2804 | 15543 | 18347 | 1140 | I A |
| 5582 | 12598 | 18180 | 1170 | I A |
| 8788 | 9183 | 17971 | 1200 | I AB |
| 11956 | 6271 | 18227 | 1230 | I B |
| 14422 | 3753 | 18175 | 1260 | I B |
| 16225 | 1910 | 19135 | 1290 | I B |
| 17733 | 811 | 18544 | 1320 | I B |
| 17637 | 554 | 16191 | 1350 | I B |
| 18034 | 454 | 18488 | 1360 | IB |
| 17829 | 348 | 18177 | 1410 | IB |
| 17914 | 295 | 18209 | 1440 | IB |
| 18059 | 279 | 18338 | 1470 | IB |
| 16249 | 225 | 18474 | 1500 | B |
| 18254 | 182 | 18436 | 1530 | B |
| 18027 | 246 | 18273 | 1560 | B |
| 18226 | 456 | 18682 | 1590 | IB |
| 18302 | 1622 | 19924 | 1620 | I B |
| 18227 | 4479 | 22706 | 1650 | I B |
| 18215 | 9996 | 28211 | 1680 | I B |

FIG. 6

| ALPHA | BETA | TOTAL | VOLTS | COUNTS - UNITS |
|---|---|---|---|---|
| 0 | 0 | 0 | 0 | •----------------- |
| 0 | 1 | 1 | 300 | • |
| 0 | 0 | 0 | 330 | • |
| 0 | 0 | 0 | 360 | • |
| 0 | 0 | 0 | 390 | • |
| 0 | 0 | 0 | 420 | • |
| 0 | 0 | 0 | 450 | • |
| 0 | 0 | 0 | 480 | • |
| 0 | 0 | 0 | 510 | • |
| 0 | 2 | 2 | 540 | • |
| 0 | 2 | 2 | 570 | • |
| 0 | 60 | 60 | 600 | • |
| 0 | 437 | 437 | 630 | A• |
| 0 | 1867 | 1867 | 660 | A • |
| 0 | 4611 | 4611 | 690 | A |
| 0 | 8238 | 8238 | 720 | A • |
| 0 | 13067 | 13067 | 750 | A |
| 0 | 16682 | 16682 | 780 | A • |
| 0 | 18382 | 18382 | 810 | A |
| 0 | 18647 | 18647 | 840 | A • |
| 0 | 18736 | 18736 | 870 | A • |
| 0 | 18901 | 18901 | 900 | A • |
| 0 | 19052 | 19052 | 930 | A • |
| 0 | 19051 | 19051 | 960 | A • |
| 0 | 19014 | 19014 | 990 | A • |
| 0 | 19235 | 19235 | 1020 | A • |
| 0 | 19063 | 19063 | 1050 | A • |
| 2 | 19192 | 19194 | 1080 | A • |
| 355 | 18696 | 19051 | 1110 | IA       B• |
| 2835 | 16157 | 18992 | 1140 | I    A          B • |
| 7005 | 12036 | 19041 | 1170 | I      A     B • |
| 11424 | 7776 | 19200 | 1200 | I    B    A • |
| 15159 | 4070 | 19229 | 1230 | I  B       A • |
| 17669 | 1471 | 19140 | 1260 | I B           A • |
| 18654 | 644 | 19298 | 1290 | I B          A• |
| 18760 | 381 | 19141 | 1320 | IB          A• |
| 19155 | 253 | 19408 | 1350 | IB          A• |
| 19165 | 197 | 19362 | 1380 | B           A• |
| 19047 | 166 | 19213 | 1410 | B           • |
| 19097 | 140 | 19237 | 1440 | B           • |
| 18980 | 262 | 19242 | 1470 | IB          A• |
| 18247 | 1102 | 19349 | 1500 | I B       A  • |
|  |  |  |  | • |

FIG. 7

| ALPHA | BETA | TOTAL | VOLTS | | | | | COUNTS - UNITS | | | |
|---|---|---|---|---|---|---|---|---|---|---|---|
| 0 | 0 | 0 | 0 | •—•—•—•—•—•—•—•—•—•—•—•—•—•—•—•—•—•—•—•—•—•—•—• | | | | | | | |
| 0 | 0 | 0 | 120 • | | | | | | | | |
| 0 | 0 | 0 | 150 • | | | | | | | | |
| 0 | 0 | 0 | 180 • | | | | | | | | |
| 0 | 0 | 0 | 210 • | | | | | | | | |
| 0 | 0 | 0 | 240 • | | | | | | | | |
| 0 | 0 | 0 | 270 • | | | | | | | | |
| 0 | 0 | 0 | 300 • | | | | | | | | |
| 0 | 0 | 0 | 330 • | | | | | | | | |
| 0 | 0 | 0 | 360 • | | | | | | | | |
| 0 | 0 | 0 | 390 • | | | | | | | | |
| 0 | 0 | 0 | 420 • | | | | | | | | |
| 0 | 0 | 0 | 450 • | | | | | | | | |
| 0 | 0 | 0 | 480 • | | | | | | | | |
| 0 | 0 | 0 | 510 • | | | | | | | | |
| 0 | 11 | 11 | 540 • | | | | | | | | |
| 0 | 227 | 227 | 570 • | | | | | | | | |
| 0 | 2255 | 2255 | 600 A | | • | | | | | | |
| 0 | 7235 | 7235 | 630 A | | | | • | | | | |
| 0 | 11247 | 11247 | 660 A | | | | | | • | | |
| 0 | 15360 | 15360 | 690 A | | | | | | | • | |
| 0 | 19626 | 19626 | 720 A | | | | | | | | • |
| 0 | 20865 | 20865 | 750 A | | | | | | | | • |
| 0 | 21520 | 21520 | 780 A | | | | | | | | • |
| 0 | 21735 | 21735 | 810 A | | | | | | | | • |
| 0 | 21764 | 21764 | 840 A | | | | | | | | • |
| 0 | 22316 | 22316 | 870 A | | | | | | | | • |
| 0 | 22735 | 22735 | 900 A | | | | | | | | • |
| 0 | 22242 | 22242 | 930 A | | | | | | | | • |
| 0 | 22700 | 22700 | 960 A | | | | | | | | • |
| 0 | 22403 | 22403 | 990 A | | | | | | | | • |
| 0 | 22188 | 22188 | 1020 A | | | | | | | | • |
| 11 | 22195 | 22206 | 1050 A | | | | | | | | • |
| 1339 | 20469 | 21808 | 1080 I | A | | | | | B | | • |
| 6109 | 16108 | 22217 | 1110 I | | A | | A B | | | B | |
| 10261 | 11571 | 21832 | 1140 I | | | | A B | | | | |
| 14486 | 7576 | 22062 | 1170 I | | | B | | | A | | |
| 17703 | 4482 | 22185 | 1200 I | | B | | | | A | | |
| 20954 | 2447 | 23401 | 1230 I | B | | | | | | A | |
| 21811 | 2235 | 24046 | 1260 I | B | | | | | | A | |
| 21903 | 2172 | 24075 | 1290 I | B | | | | | | A | |
| 22221 | 1960 | 24181 | 1320 I | B | | | | | | A | |
| 22390 | 1827 | 24217 | 1350 I | B | | | | | | A | |
| 22369 | 1860 | 24229 | 1380 I | B | | | | | | A | |
| 22414 | 1950 | 24364 | 1410 I | B | | | | | | A | |
| 21737 | 2260 | 23997 | 1440 I | B | | | | | | A | |
| 19043 | 8127 | 27170 | 1470 I | | | B | | | | A | |

FIG. 8

| ALPHA | BETA | TOTAL | VOLTS | COUNTS - UNITS |
|---|---|---|---|---|
| 0 | 0 | 0 | 0 | •------------------------------- |
| 0 | 0 | 0 | 600 | • |
| 0 | 2 | 2 | 630 | • |
| 0 | 2 | 2 | 660 | • |
| 0 | 1 | 1 | 690 | • |
| 0 | 1 | 1 | 720 | • |
| 0 | 0 | 0 | 750 | • |
| 0 | 1 | 1 | 780 | • |
| 0 | 0 | 0 | 810 | • |
| 0 | 0 | 0 | 840 | • |
| 0 | 0 | 0 | 870 | • |
| 0 | 1 | 1 | 900 | • |
| 0 | 6 | 6 | 930 | • |
| 0 | 45 | 45 | 960 | • |
| 0 | 287 | 287 | 990 | • |
| 0 | 1091 | 1091 | 1020 | A• |
| 0 | 2348 | 2348 | 1050 | A • |
| 0 | 4025 | 4025 | 1080 | A  • |
| 0 | 5894 | 5894 | 1110 | A    • |
| 0 | 8587 | 8587 | 1140 | A      • |
| 0 | 12036 | 12036 | 1170 | A        • |
| 0 | 16015 | 16015 | 1200 | A |
| 0 | 21518 | 21518 | 1230 | A             • |
| 2 | 27593 | 27595 | 1260 | A                • |
| 0 | 34685 | 34685 | 1290 | A |
| 1 | 41268 | 41269 | 1320 | A                      • |
| 0 | 46422 | 46422 | 1350 | A |
| 0 | 49830 | 49830 | 1380 | A                            • |
| 0 | 51253 | 51253 | 1410 | A                              • |
| 26 | 52101 | 52127 | 1440 | A                              • |
| 269 | 52193 | 52462 | 1470 | A                         B• |
| 1188 | 51602 | 52785 | 1500 | IA                        B• |
| 2712 | 50233 | 52945 | 1530 | I  A                   B  • |
| 5138 | 48106 | 53244 | 1560 | I   A                B   • |
| 8888 | 44313 | 53201 | 1590 | I     A           B    • |
| 14498 | 38994 | 53492 | 1620 | I       A        B      • |
| 23468 | 29539 | 53007 | 1650 | I         A  B           • |
| 35603 | 17336 | 52939 | 1680 | I      B        A        • |

FIG. 9

| ALPHA | BETA | TOTAL | VOLTS | COUNTS - UNITS |
|---|---|---|---|---|
| 0 | 0 | 0 | 0 | •----•----•---•---•---•---•---•---•---•---•---•---•---•---•---•---•---•---• |
| 0 | 0 | 0 | 495 | • |
| 0 | 0 | 0 | 525 | • |
| 0 | 0 | 0 | 555 | • |
| 0 | 0 | 0 | 585 | • |
| 0 | 0 | 0 | 615 | • |
| 0 | 0 | 0 | 645 | • |
| 0 | 0 | 0 | 675 | • |
| 0 | 0 | 0 | 705 | • |
| 0 | 1 | 1 | 735 | • |
| 0 | 0 | 0 | 765 | • |
| 0 | 0 | 0 | 795 | • |
| 0 | 1 | 1 | 825 | • |
| 0 | 1 | 1 | 855 | • |
| 0 | 0 | 0 | 885 | • |
| 0 | 1 | 1 | 915 | • |
| 0 | 2 | 2 | 945 | • |
| 0 | 7 | 7 | 975 | • |
| 0 | 78 | 78 | 1005 | • |
| 0 | 591 | 591 | 1035 | • |
| 0 | 1890 | 1890 | 1065 A | • |
| 0 | 3722 | 3722 | 1095 A | • |
| 0 | 6386 | 6386 | 1125 A | • |
| 0 | 9984 | 9984 | 1155 A | • |
| 0 | 14513 | 14513 | 1185 A | • |
| 0 | 20488 | 20488 | 1219 A | • |
| 1 | 27970 | 27971 | 1245 A | • |
| 2 | 36239 | 30241 | 1275 A | • |
| 1 | 43136 | 43137 | 1305 A | • |
| 0 | 48159 | 48159 | 1335 A | • |
| 2 | 50460 | 50462 | 1365 A | • |
| 62 | 51320 | 51382 | 1395 A | • |
| 571 | 51571 | 52142 | 1425 A | B• |
| 2311 | 49963 | 52274 | 1455 I A | B • |
| 4923 | 47112 | 52035 | 1485 I    A | B  • |

FIG. 10

| ALPHA | BETA | TOTAL | VOLTS | COUNTS-UNITS |
|---|---|---|---|---|
| 0 | 0 | 0 | 660 | • |
| 0 | 1 | 1 | 690 | • |
| 0 | 0 | 0 | 720 | • |
| 0 | 0 | 0 | 750 | • |
| 0 | 0 | 0 | 780 | • |
| 0 | 0 | 0 | 810 | • |
| 0 | 0 | 0 | 840 | • |
| 0 | 0 | 0 | 870 | • |
| 0 | 0 | 0 | 900 | • |
| 0 | 0 | 0 | 930 | • |
| 0 | 0 | 0 | 960 | • |
| 0 | 101 | 101 | 990 | • |
| 0 | 807 | 807 | 1020 | A• |
| 0 | 2512 | 2512 | 1050 | A • |
| 0 | 5036 | 5036 | 1080 | A • |
| 0 | 8206 | 8206 | 1110 | A • |
| 0 | 12372 | 12372 | 1140 | A • |
| 0 | 18466 | 18466 | 1170 | A • |
| 0 | 25964 | 25964 | 1200 | A • |
| 0 | 34939 | 34939 | 1230 | A • |
| 0 | 44071 | 44071 | 1260 | A • |
| 2 | 50768 | 50768 | 1290 | A • |
| 1 | 54213 | 54214 | 1320 | A • |
| 1 | 55815 | 55816 | 1350 | A • |
| 62 | 56054 | 56116 | 1380 | A • |
| 698 | 55004 | 55702 | 1410 | IA B• |
| 2868 | 53211 | 56079 | 1440 | I A B • |
| 6075 | 49930 | 56005 | 1470 | I A B • |
| 11460 | 44964 | 56424 | 1500 | I A B • |
| 19998 | 36310 | 56308 | 1530 | I A B • |
| 34316 | 22140 | 56456 | 1560 | I B A • |
| 49549 | 7249 | 56798 | 1590 | I B A • |

FIG. 11

PROPORTIONAL COUNTER DETECTOR

TECHNICAL FIELD

This invention relates generally to the detection of low levels of radioactivity, such as alpha and beta particles, by the use of a proportional counter detector, and more particularly to a detector for this purpose that has enhanced resolution through the use of at least one specially gridded anode.

BACKGROUND ART

In the analysis of samples for the determination of the quantity of radioactive constituents, it is conventional practice to place the sample proximate a gas-filled proportional counter. The radioactive decay products of the sample, either alpha particles or beta particles, or both, cause ionization of the gas giving rise to positive ions and electrons. The electrons are placed under the influence of an electric field created between an anode and the grounded surface of the detector. This results in a current at the anode that can be related to the radioactive constituent concentration within the sample.

A typical system for this type of analysis is that described in a brochure of Tennelec Model LB 5500 automatic low background alpha/beta counting system of Tennelec/Nucleus, Inc., Oak Ridge, Tennessee. This particular system utilizes a pair of "pancake"-type gas flow proportional counters stacked one above the other. The upper detector senses high energy cosmic radiation, while the lower detector analyzes for alpha and beta radiation emitted from a sample contained in a planchet placed below. Each of the detector units contains at least one anode traversing the pancake, with the anode maintained at a potential suitable for collection of the electrons being produced in the detector gas by the radiation. The grounded surface of the pancake is typically known as the "puck". Typically, the pancake adjacent the sample planchet has a very thin window so as to contain the gas within the proportional counter.

Another Tennelec system utilizing this type of detector is described in a bulletin on Model LB 4000, a multidetector low level alpha/beta counting system.

Although this system has been used effectively for radiation detection, there have been certain disadvantages to the detector design. One is the non-uniformity of the field strength (the potential difference between the anode and ground). This field strength was found to vary along the wire. This is due to the close spacing toward the ends of the anode wires, and then any spacing toward adjacent anode wires if more than one is used. These field differences are caused by the different spacing distances for a given applied voltage on the anode. Further, in a windowless configuration, if the sample develops an electrical charge, this charge adversely affects the field distribution.

Another detector construction for determining ionizing particle presence is described by O. Bunemann, T. E.Cranshaw and J. A. Harvey in "Design of Grid Ionization Chambers" as published in *Canadian Journal of Research*, Vol. 27, Sec. A, pp. 191-206. This experimental gas-filled ion chamber (not a proportional chamber) consisted of two parallel plates mounted within a cylindrical vessel. Mounted in front of the collector was a grid of parallel wires to shield the collector from positive ions generated in the ionization process. The theory of that system, which is incorporated herein by reference, and some experimental results are reported in that publication.

It is an object of the present invention to provide a pancake-type radiation detector having at least one anode traversing across the pancake wherein substantially improved uniformity of field strength is achieved along the anode.

It is another object of the present invention to provide a pancake-type detector for ionizing particles having at least one anode traversing across the pancake, the anode being surrounded by a perforated grid spaced therefrom, whereby substantially improved uniformity of field strength is achieved along the anode.

It is a further object of the present invention is to provide a pancake-type detector for ionizing particles having at least one anode traversing across the pancake, the anode being surrounded by a perforated grid spaced therefrom, the grid being maintained at an intermediate potential between the potential of the anode and ground, whereby substantially improved uniformity of field strength is achieved along the anode.

Another object of the present invention is to provide a pancake-type detector for ionizing particles that does not require a window to admit the ionizing particles thereby increasing the detection efficiency of alpha and low energy beta particles by the detector.

These and other objects and advantages of the present invention will become apparent upon a consideration of the drawings referred to hereinafter and a complete description thereof.

DISCLOSURE OF THE INVENTION

In accordance with the present invention, there is provided in one embodiment a gas-filled proportional detector in the form of a body with a pancake-type cavity having a flat base wall and a cylindrical edge wall. This body is traversed by at least one anode, with a perforated grid surrounding the anode(s) in a substantially concentric manner. In one embodiment this grid is a spiral; however, other perforated grid constructions are of use. An electrical potential is applied to the anode(s) so as to create an electrical field between the anode(s) and the grid, and a lesser field is created between the grid and the body. With either a single gridded anode or with multiple gridded anodes, the detector can be fabricated without the use of a window to contain the counter gas.

BRIEF DESCRIPTION OF THE DRAWINGS

FIG. 6 is a plot of data, together with a tabulation of anode voltage and detected counts, for a detector of the prior art when tested with a polonium-210 sample, Po-210 being primarily an alpha emitter.

FIG. 7 is a plot of data, together with a similar tabulation as in FIG. 6, for a detector of the present invention when tested with a polonium-210 sample and using a window on the detector.

FIG. 8 is similar Po-210 data obtained with a detector of the present invention having the window removed.

FIG. 9 is a similar depiction of data for a prior art detector when the sample was strontium-90, a primarily beta emitter.

FIG. 10 is a depiction of data for Sr-90 with a detector of the present invention having a window.

FIG. 11 is a depiction of data for Sr-90 with a detector of the present invention having the window removed.

BEST MODE FOR CARRYING OUT THE INVENTION

Figure 1:
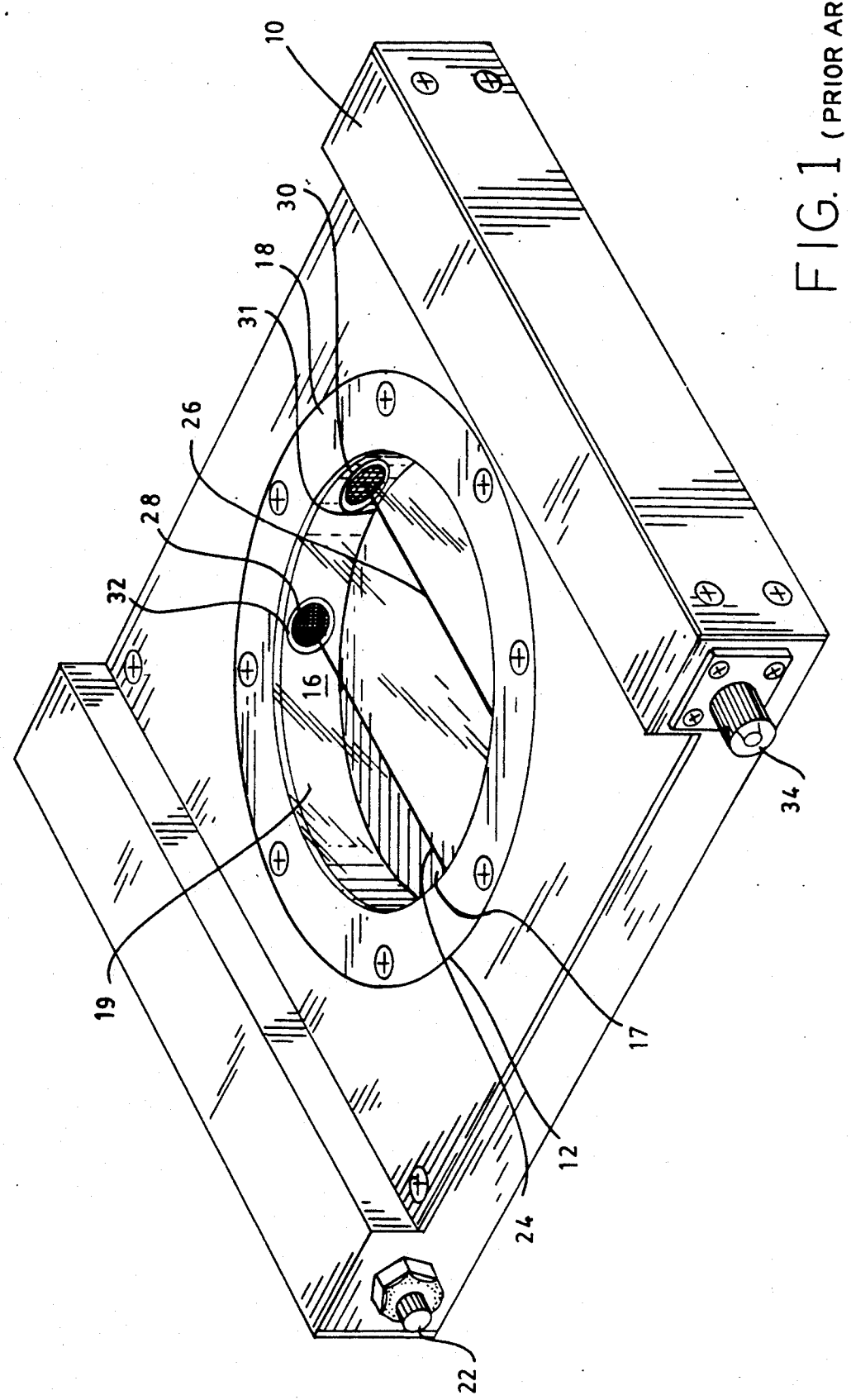
FIG. 1 is an isometric drawing of a prior art detector as used with the system described in the afore-cited Tennelec brochures.

The present invention can best be understood by first having an understanding of the detector element that it replaces. This prior art detector is illustrated in the isometric drawing of FIG. 1. For the particular analytical apparatus of the Tennelec system, there is a detector holder 10 (typically fabricated from plastic) into which a detector 12 is inserted. The detector 12 is generally a "pancake" configuration defined by a shallow cup having a flat base 14 and a cylindrical wall 16. There is a highly transparent window member 17, normally mounted on a window ring 18, that is parallel to the base 14 so as to maintain a desired gaseous environment within the detector volume 19 established by the base 14, the wall 16 and the window 17. This window member is substantially transparent to alpha and beta particles, and can be a metallic coated plastic. The metal is typically gold, and the interior of the cup (base and wall) is similarly coated with an inert and electrically conductive metal, typically gold. Gas is supplied to the interior of the detector through an inlet line 22 and passages (not shown) within the body 10. This gas is typically a commercial P-10 gas (a mixture of argon and methane) which will be known to any person skilled in the art, but can be any gas suitable for proportional counters.

Traversing the cup of the detector 12 are a pair of parallel anode wires 24, 26 that are supported at their ends in insulators 28, 30, respectively, typically in hypodermic tubes 31. These anode wires are typically stainless steel and one mil (0.025 mm) in diameter. It will be understood that the opposite ends of the anode wires are also supported in insulators and hypodermic tubes which are not seen in this drawing. In addition to being parallel to each other, the anode wires are parallel to the base 14. The insulators are each typically positioned within openings in the wall 16 such as that illustrated at 32. Voltage is applied to the anode wires via a high voltage connector 34 and connections within the body 10. This voltage is typically about 900 to about 1500 Volts DC. Any signal generated due to the presence of electrons from the interaction of ionizing particles and the gas is received at the connector 34 (there being connections within the body 10 to the anode wires) such that the signal can be conveyed to any appropriate signal processing means (see FIG. 5).

Figure 2:
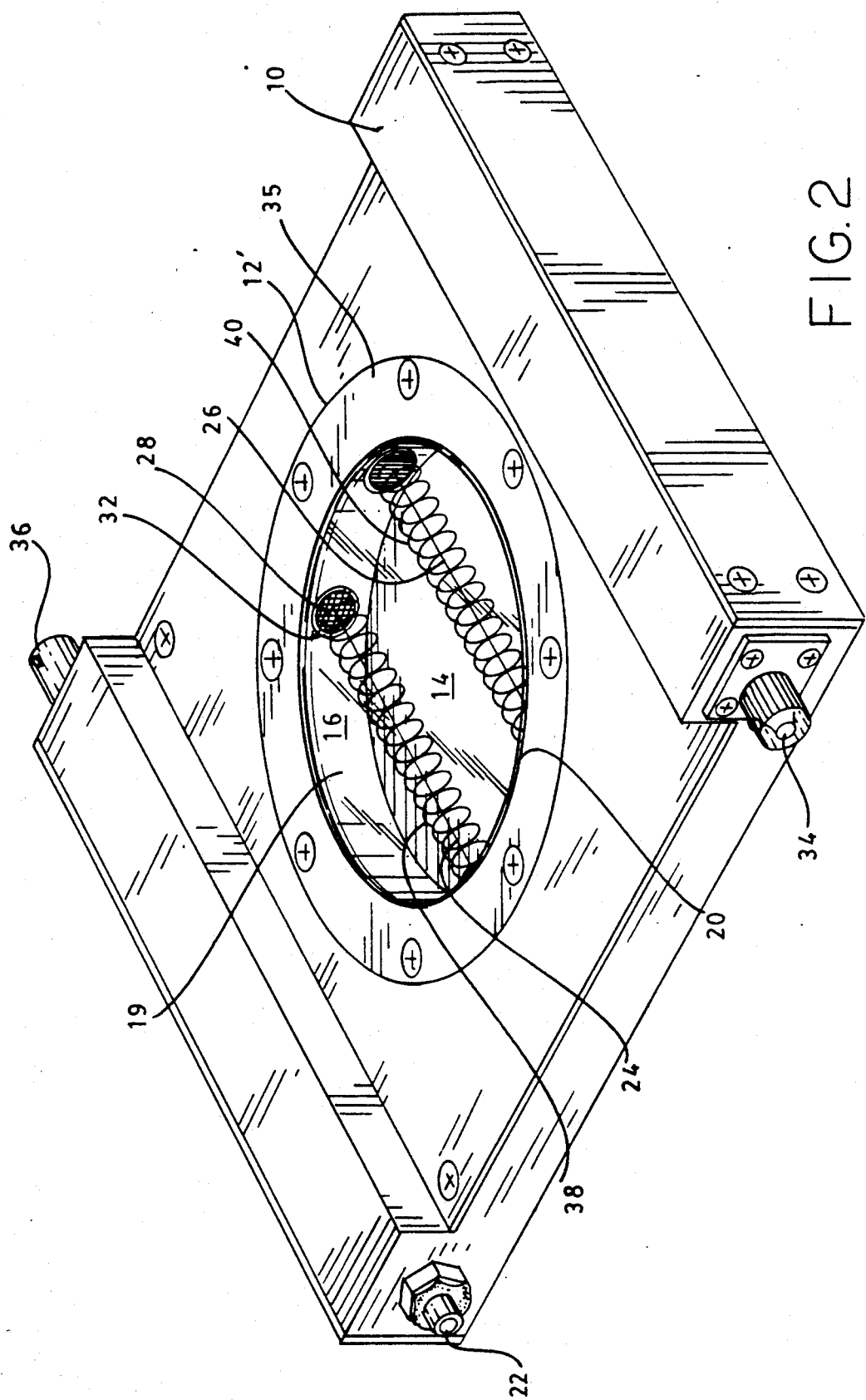
FIG. 2 is an isometric drawing of a detector of the present invention as constructed for use in the same system.

An important change to the standard detector system of FIG. 1 is illustrated in FIG. 2. In this FIG. 2 all components that are the same as in FIG. 1 are identified by the same numbers. Components that are modified but perform the same function are identified with primed numbers. The improved detector 12' utilizes, in this embodiment, the same two anode wires 24, 26 as used in the prior art of FIG. 1. However, anode wire 24 is encircled with a coiled (spiral) grid 38, and anode wire 26 is encircled with a coiled (spiral) grid 40. The grids 38, 40 are substantially concentric with their respective anode wires. Typically, the spiral grids are fabricated from the same material as the anode wires, such as stainless steel. Of course, other materials such as piano wire (the composition being well known in the art) can be used. Although spacing between turns of the coils is generally equal to or less than the radial distance between the anode wires and the interior of the coil, this spacing can typically be up to two times the radial distance.. The O.D. of the spiral coils is typically about 0.187 in. (4.5 mm), and the wire is typically about fifteen mils (0.38 mm) in diameter. The spacing between coils is typically about 0.084 in. (2.1 mm). As in the detector of FIG. 1, the anode wire have a diameter of about 1 mi (0.025 mm). A voltage, typically about 50 to about 300 Volts DC, is applied to each of the coil grids as explained hereinafter. So that this can be accomplished, the coil grids 38, 40 are insulated from ground, as illustrated in FIG. 3A.

Although spiral grids are illustrated in the form of a spring, other grid embodiments to accomplish the essence of the invention can be used. For example, the grid can be a mesh, a series of wires that are parallel to the anode wires, etc. For this reason, the general term for the grid is "perforated" meaning that the grid has openings for the passage of electrons into the region of the anode wire.

Two other features of the invention are also illustrated in FIG. 2. As discussed hereinafter, the improved detector can be operated without a window (element 17 of FIG. 1). For such operation, there is a resilient seal 20 in a ring 35 to engage a portion of the sample system to prevent loss of gas from the detector volume 19. Also illustrated at 36 is a separate connector for deriving a signal from the detector. This permits obtaining the bias for the grids from the high voltage applied to the anode wire (via resistive division), as discussed hereinafter.

Figure 3:
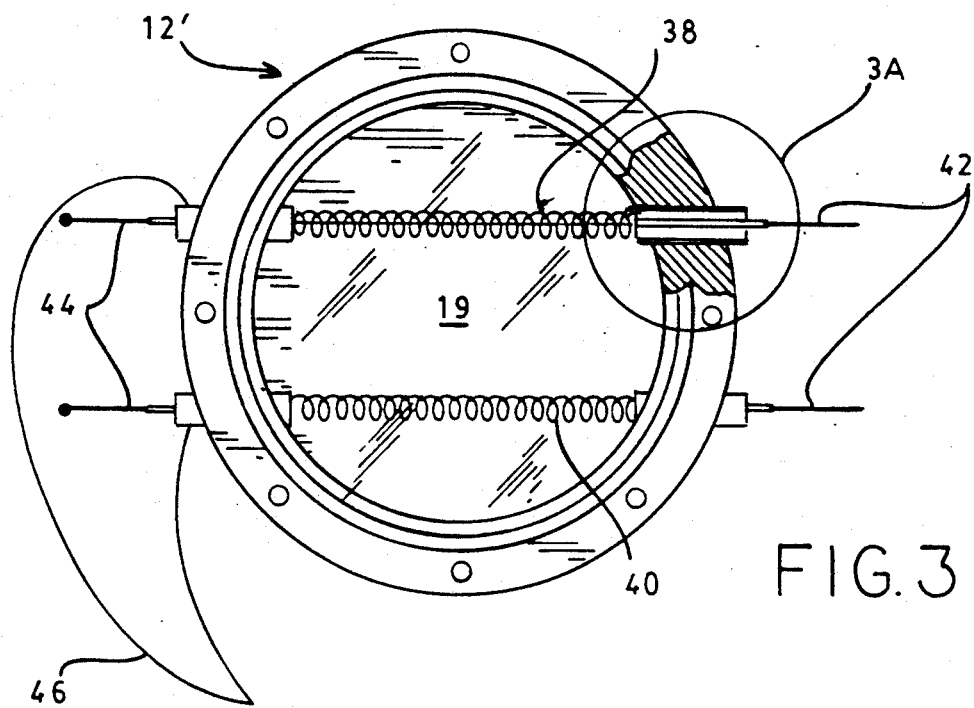
FIG. 3 is a plan view of a detector of the present invention of the embodiment of FIG. 2 showing the two gridded anodes.
Figure 3A:
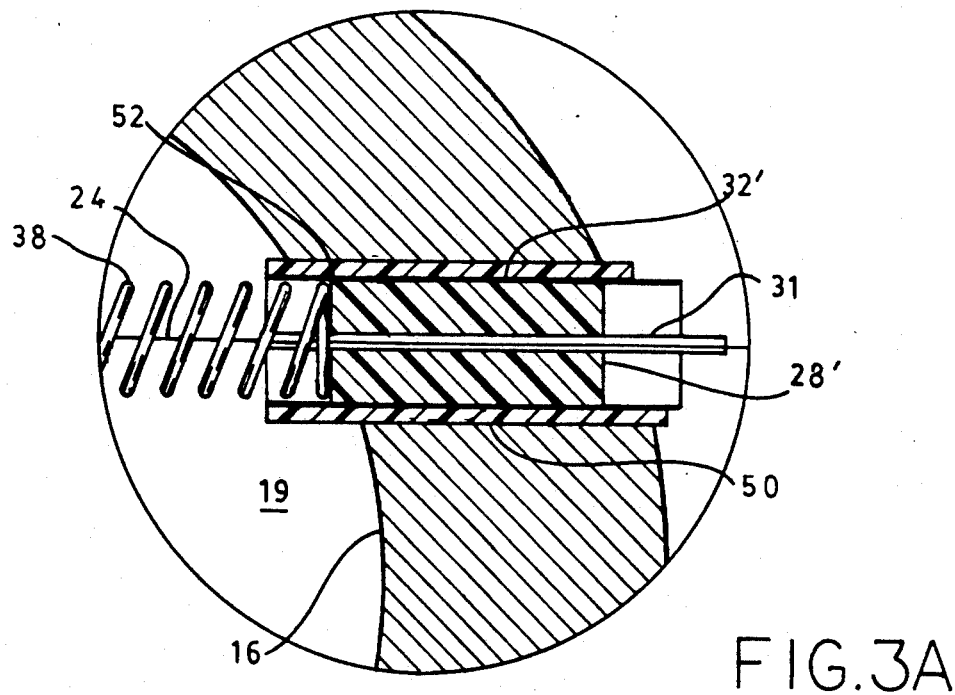
FIG. 3A is an enlarged cross-sectional drawing of the feed-through portion of the embodiment of FIG. 3 taken at the circle designated 3A therein.

A plan view of the embodiment 12' of the invention of FIG. 2 is shown in FIG. 3, with a cut-away cross section designated by the circle 3A (corresponding with FIG. 3A). This drawing illustrates the extensions 42, 44 of the anode wires 24, 26 at each end for the connection of leads from a high voltage supply (see FIG. 5) and leads to the signal output connection 36 (see FIG. 2). Also illustrated are the supply wires 46 for applying the bias to the coil grids 38, 40.

A typical mounting of the anode wires and coil grids of the present invention is illustrated in the enlarged cross-sectional drawing of FIG. 3A. It will be understood that this mounting occurs at both ends of all the anode wires and the coil grids. According to this structure, the end of anode wire 24 is attached to a hypodermic feed-through 31 which passes through an appropriate insulator 28' This insulator 28' is held within a metallic tubing, such as a thin brass tube, 32'. This tube, in turn, is mounted in an appropriate outer insulator 50 whereby the tube 32' is insulated from the chamber wall 16. The coil grid 38 surrounding the anode wire 24 is electrically connected to the thin metal tube 32' using, for example, a conductive epoxy as at 52.

In the prior art, very small detectors e.g., about one inch diameter (2.54cm) have been operated with a single anode wire. Detectors of about two inch (5 cm) diameter have required two anode wires, and detectors of about five inch (12.7 cm) diameter often have up to four anode wires. Thus, the present invention envisions whatever number of anode wires are required, with each having a surrounding grid. A detector having a single unit is illustrated in the plan view of FIG. 4, a portion being cut away and designated as 4A. There is a single anode wire 54 and a single coil grid 56, the other components being the same.

Figure 4:
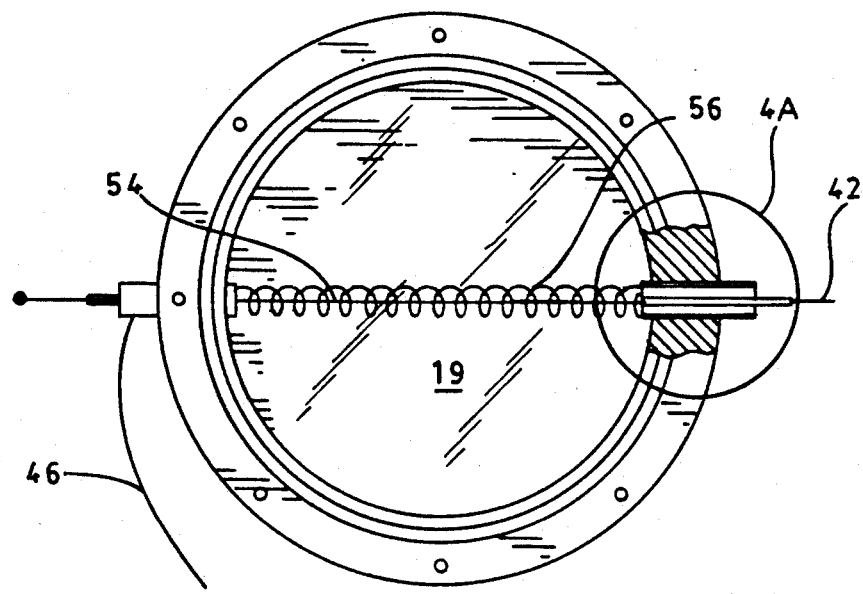
FIG. 4 is a plan view of a detector of the present invention showing one gridded anode.
Figure 4A:
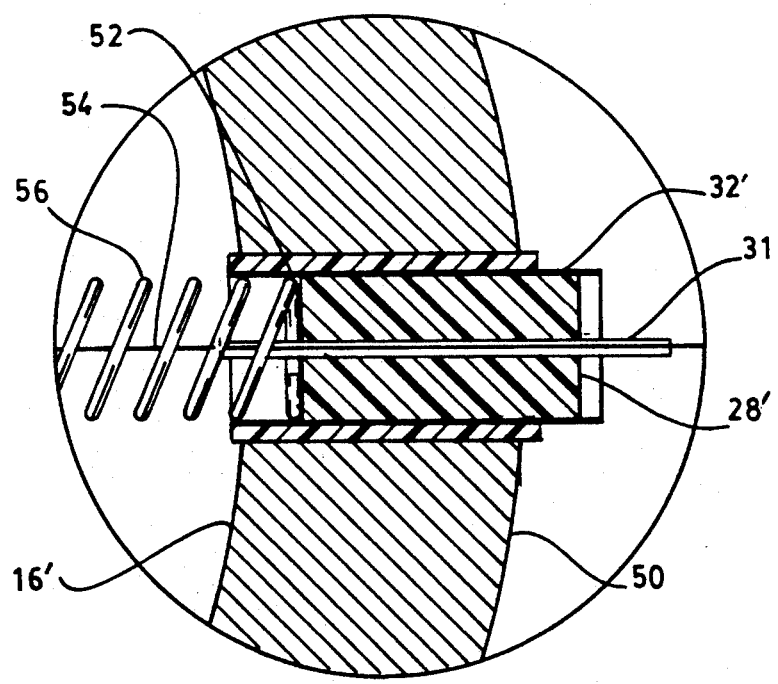
FIG. 4A is an enlarged cross-sectional drawing of the feed-through portion of the embodiment of FIG. 4 taken at the circle designated 4A therein.

Then in FIG. 4A is shown an enlargement of the circled portion. All components of the feed-through structure are the same as in FIG. 3A except that they are oriented radially within the detector wall 16'.

The detectors of FIG. 3 and FIG. 4 are used in the same manner as those of the prior art (FIG. 1). This is depicted in the schematic circuit diagram of FIG. 5. Anode potential (about 900 to about 1500 Volts DC) is provided by an appropriate power supply 58 of conventional design. Similarly, bias (about 50 to about 300 Volts DC) for the grids is supplied from an appropriate bias supply 60, also of conventional design. In an alternate construction, the grid coil bias voltage can be obtained by resistive division of the anode high power supply. The components $R_B$, $C_C$, $R_F$ and $C_F$ are part of a standard charge-sensitive preamplifier 62. Resistor $R_B$ applies the high voltage to the anode wire extension 42 without loading the signal. This resistor typically has a value of ten to one-hundred MOhm. Capacitor $C_C$ decouples the high voltage present on the anode wire from the preamplifier input, and $C_F$ and $R_F$ determine the charge-to-voltage gain and the shaping of the preamplifier. The output of the preamplifier 62 is fed to a signal processor 64 which amplifies the signal and maximizes the signal-to-noise ratio for the system. The output signal from the processor 64 then goes to a counter 66, as shown. The processor 64 and the counter 66 are of a construction that would be known to persons skilled in the art.

Figure 12A:
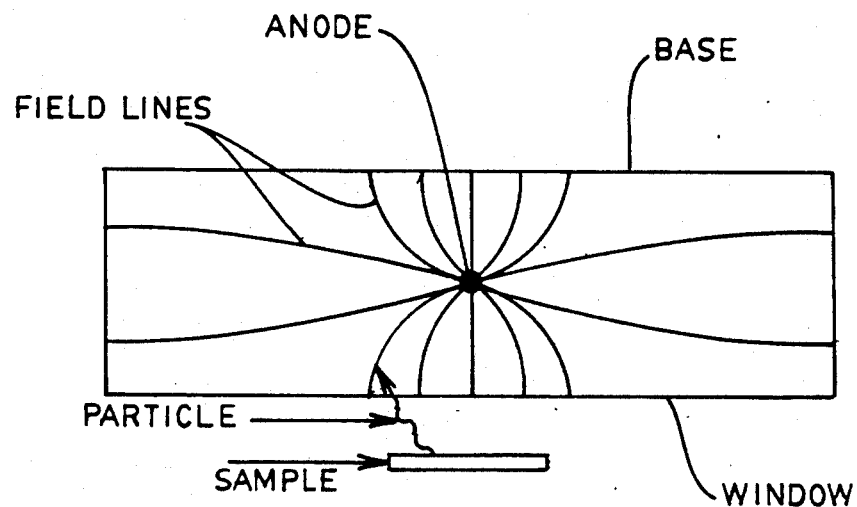
FIG. 12A is a drawing depicting field lines within the prior art detector of FIG. 2.

As stated above, the construction of the prior art detectors of the pancake design have exhibited non-uniform electrical fields. This can be seen in FIG. 12A. The ionized track caused by the incident radioactive particle is acted on by this non-uniform field. The gas multiplication of the detector, being related to the electric field strength, then varies as a result of this non-uniform field.

Figure 12B:
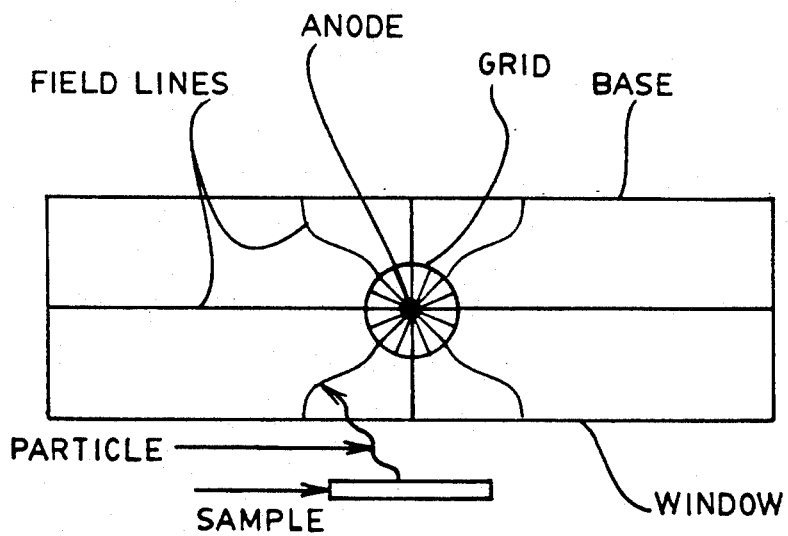
FIG. 12B illustrates the field lines that exist with the detector of the present invention.

The improvement effected by the present invention is illustrated in FIG. 12B. Here the ionized track is first directed toward the grid by the lower electric field caused by the bias applied to the grid. As the electrons approach the grid, the higher electric field within the grid accelerates the electrons toward the anode with a very uniform and high electric field. This results in a very consistent gas multiplication. This more consistent gas multiplication results in a signal at the output of the signal processor that better represents the energy of the incident radiation.

Figure 5:
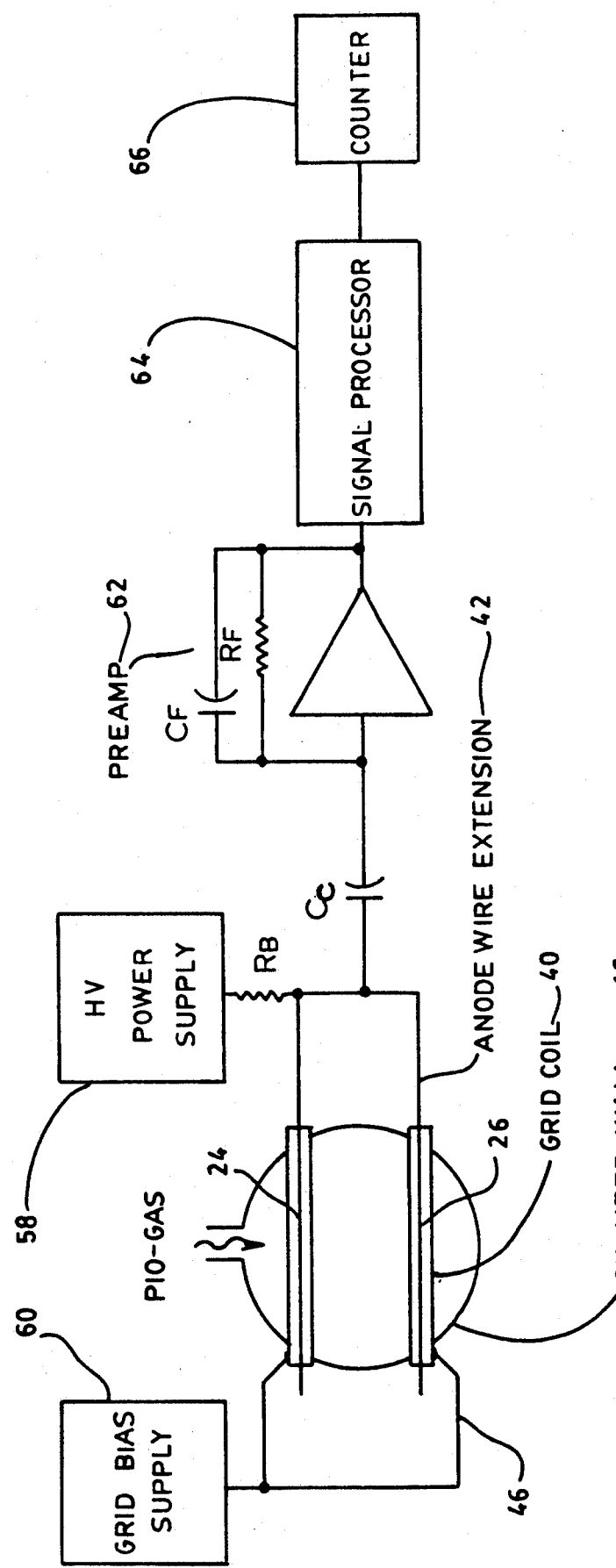
FIG. 5 is a schematic circuit drawing illustrating the use of the invention of the present invention (the embodiment of FIGS. 2 and 3) in an otherwise conventional system for the analysis of radioactivity of a sample.

A detector unit of the type illustrated in FIGS. 2 and 3 was tested using a circuit such as depicted in FIG. 5. A sample of a substantially pure alpha particle emitter was used in the form of polonium-210, as well as a sample of a substantially pure beta particle emitter in the form of strontium-90. The plateau for each was obtained on the basis of the individual counts of alpha and beta radiation (and the sum of the same), and this was compared with results using a detector of prior art design. Also, the same type of data were obtained using a detector where the window was removed.

The results for the polonium test are shown in FIGS. 6–8. The data plotted in FIG. 6 is for the detector of the prior art using two unshielded anode wires. At the extreme left of the FIGURE is listed the number of alpha counts recorded at the voltage shown in the right hand column. The second from the left column is a listing of the beta counts, and in the third (from the left) column is tabulated the sum of both the alpha and beta counts. Similar data are plotted in FIG. 7 when using a detector having two gridded anode wires with a detector window, and in FIG. 8 is shown data when no window is used with two gridded anode wires. Persons skilled in the art will recognize that the data of FIG. 7 demonstrates an improvement in "cross-talk" (the ratio of alpha counts to beta counts) over that of the prior art (FIG. 6). An improvement in efficiency is then obtained, but with increased cross-talk, when the detector window is removed as illustrated by the data in FIG. 8.

Data for the strontium testing is depicted in FIGS. 9–11. FIG. 9 is for a detector of the prior art (two un-gridded anode wires), FIG. 10 is for a detector of the present invention using two grid-shielded anode wires, and FIG. 11 is for a detector of the present invention using two grid-shielded anode wires and with the window removed. As in the case of the polonium, persons skilled in the art will recognize that an improvement has been made through use of the present invention.

While the above data is for specific essentially "pure" alpha and beta emitters, the present invention provides an improvement for other known alpha and beta emitters, whether emitting substantially only one type of particle or a mixture thereof.

From the foregoing, it will be recognized by persons skilled in the art that an improved proportional detector for low levels of radioactivity has been provided. Through the use of an encircling perforated (e.g., a spiral) grid for each anode wire, a more uniform field is created along the anode wire(s). Further, since the grid provides electrical shielding, the window of the detector can be omitted, a considerable improvement in detection efficiency is achieved for alpha and/or beta particles. The present invention has been illustrated for use in a pancake-type detector. It will be understood, however, that the principles thereof are useful in detectors of other configurations. Although certain values are used to illustrate the present invention, these are not given to limit the invention. Rather, the invention is to be limited only by the appended claims and their equivalents.

I claim:

1. An improved proportional detector for determining low concentrations of radioactivity, said detector comprising:

a detector body member defining a cavity having an open face;

a proportional detector gas composition contained within said cavity;

at least one anode member traversing said cavity for multiplying and collecting electrons resulting from interaction of said radioactivity with said gas, said at least one anode member being electrically insulated from said body member;

a conductive perforated grid member substantially concentric with said at least one anode member, said perforated grid member having openings for the passage of said electrons and being electrically insulated from said body member and from said at least one anode member for isolating said at least one anode member from said body;

a source for applying a selected voltage to said at least one anode member; and a further source for applying a selected voltage to said grid member of a value less than said selected voltage on said at least one anode member.

2. The detector of claim 1 further comprising a window positioned at said open face of said body member, said window being substantially transparent to said radioactivity, said window maintaining said gas within said cavity.

3. The detector of claim 1 wherein said at least one anode member is a cylindrical wire, and wherein said grid member is a circular spiral, turns of said spiral being spaced apart a distance less than about twice a radial distance between said anode member and said spiral grid member.

4. The detector of claim 1 wherein said proportional detector gas is a mixture of argon and methane flowing through said cavity, said at least one anode member is stainless steel wire of about one mil in diameter (0.0254 mm) in diameter, and said grid member is fabricated from a metal wire of about fifteen mils (0.38 mm) diameter selected from stainless steel and piano wire and is a spiral having an outer diameter of about 0.187 in. (4.7 mm) and a spacing between turns of said spiral of less than about 0.084 in. (2.1 mm).

5. The detector of claim 1 further comprising:
a signal processing means connected to said at least one anode member to receive a signal from said at least one anode member corresponding to a number of electrons collected by said at least one anode member; and
a counter means connected to said signal processing means to produce information related to a concentration of said radioactivity.

6. The detector of claim 1 wherein a plurality of anode members traverse said cavity, each of said anode members being parallel to each other, each of said anode members being surrounded by a perforated grid member in substantially concentric orientation, said plurality of said anode members and said perforated grid members being electrically insulated from said body member, and said grid members being electrically insulated from said plurality of said anode members.

7. The detector of claim 6 wherein said anode members are cylindrical wires, and wherein said grid members are circular spirals, turns of said spirals being spaced apart a distance less than about twice a radial distance between said anode members and said spiral grid members.

8. The detector of claim 1 wherein said selected voltage applied to said at least one anode member is about 900 to about 1500 Volts DC, and wherein said selected voltage applied to said grid member is about 50 to about 300 Volts DC.

9. The detector of claim 6 further comprising:
a source for applying a selected voltage to said plurality of anode members; and
a further source for applying a selected voltage to said grid members of a value less than said selected voltage on said anode members.

10. The detector of claim 9 wherein said selected voltage applied to said anode members is about 900 to about 1500 Volts DC, and wherein said selected voltage applied to said grid members is about 50 to about 300 Volts DC.

11. An improved proportional detector for determining low concentrations of alpha- and beta-emitting radioactivity, said detector comprising:
a cup-shaped detector body member defining a cavity having a flat disk-shaped base and a cylindrical wall, said cavity having an open face opening away from said base;
a proportional detector gas composition contained within said cavity, said detector gas selected from a group consisting essentially of argon and a mixture of argon and methane;
at least one anode wire traversing said cavity for multiplying and collecting electrons resulting from interaction of said radioactivity with said gas said at least one anode wire being oriented parallel to said base and electrically insulated from said body member;
a perforated grid member substantially concentric with said at least one anode wire said grid electrically insulated from said body member and from said at least one anode wire, said grid provided with openings therein for the passage of said electrons;
a source for applying a selected voltage to said at least one anode member; and
a further source for applying a selected voltage to said grid member of a value less than said selected voltage on said at least one anode member.

12. The detector of claim 11 wherein said selected voltage applied to said at least one anode member is about 900 to about 1500 Volts DC, and wherein said selected voltage applied to said grid member is about 50 to about 300 Volts DC.

13. The detector of claim 11 further comprising a window positioned at said open face of said body member, said window being substantially transparent to said radioactivity, said window maintaining said gas within said cavity.

14. The detector of claim 11 wherein a plurality of said anode members traverse said cavity, each of said anode members being parallel to each other and to said base, each of said anode members being surrounded by a perforated grid member in concentric orientation, said plurality of said anode members and said perforated grid members being electrically insulated from said body member, and said grid members being electrically insulated from said plurality of said anode members.

15. The detector of claim 11 wherein said about 900 to about 1500 Volts DC, and wherein said selected voltage applied to said grid members is about 50 to about 300 Volts DC.

16. The detector of claim 11 wherein said at least one anode wire is stainless steel of about one mil (0.0254mm) in diameter, and said grid member is a spiral spring fabricated from a metallic wire of about fifteen mils (0.38 mm) in diameter selected from a group consisting of stainless steel and piano wire and having an outer diameter of about 0.187 in. (4.7 mm) and a spacing between turns of said spiral of less than about 0.084 in. (2.1 mm).

17. The detector of claim 11 further comprising:
a signal processing means connected to said at least one anode member to receive a signal from said at least one anode member corresponding to a number of electrons collected by said at least one anode member; and
a counter means connected to said signal processing means to produce information related to a concentration of said radioactivity.

18. The detector of claim 14 further comprising:
a signal processing means connected to said plurality of anode members to receive a signal from said anode members corresponding to a number of electrons collected by said anode members; and
a counter means connected to said signal processing means to produce information related to a concentration of said radioactivity.

19. An improved proportional detector for determining low concentrations of alpha- and beta-emitting radioactivity, said detector comprising:
detector body member defining a cavity having a flat disk-shaped base and a cylindrical wall, said cavity having an open face opening away from said base;
a proportional detector gas composition contained within said cavity, said detector gas selected from a group consisting essentially of argon and a mixture of argon and methane;
at least one anode wire traversing said cavity for multiplying and collecting electrons resulting from interaction of said radioactivity with said gas said at least one anode wire being oriented parallel to said base and electrically insulated from said body member;
a circular spiral grid substantially concentric with said at least one anode wire, said spiral grid electrically insulated from said body member and from said at least one anode wire, spacing between spirals of said spiral grid being less than about twice a radial distance between said at least one anode wire and an inner diameter of said spiral grid;
a source for applying a selected voltage to said at least one anode member;
a further source for applying a selected voltage to said grid member of a value less than said selected voltage on said at least one anode member;
a signal processing means connected to said at least one anode member to receive a signal from said at least one anode member corresponding to a number of electrons collected by said at least one anode member; and
a counter means connected to said signal processing means to produce information related to a concentration of said radioactivity.

* * * * *